United States Patent
Levari et al.

(10) Patent No.: US 10,303,702 B2
(45) Date of Patent: May 28, 2019

(54) SYSTEM AND METHOD FOR ANALYSIS AND MANAGEMENT OF DATA DISTRIBUTION IN A DISTRIBUTED DATABASE ENVIRONMENT

(71) Applicant: IGNITE SCALARC SOLUTIONS, INC., Austin, TX (US)

(72) Inventors: Doron Levari, Newton, MA (US); Petr Dvorak, Winchester, MA (US); Vladimir Vexler, Bat-Yam (IL)

(73) Assignee: Ignite ScalArc Solutions, Inc., Austin, TX (US)

( * ) Notice: Subject to any disclaimer, the term of this patent is extended or adjusted under 35 U.S.C. 154(b) by 381 days.

(21) Appl. No.: 14/615,903

(22) Filed: Feb. 6, 2015

(65) Prior Publication Data
US 2015/0227521 A1    Aug. 13, 2015

Related U.S. Application Data

(60) Provisional application No. 61/936,921, filed on Feb. 7, 2014.

(51) Int. Cl.
*G06F 17/30* (2006.01)
*G06F 16/27* (2019.01)

(52) U.S. Cl.
CPC ................... *G06F 16/278* (2019.01)

(58) Field of Classification Search
None
See application file for complete search history.

(56) References Cited

U.S. PATENT DOCUMENTS

| | | |
|---|---|---|
| 5,675,791 A | 10/1997 | Bhide et al. |
| 5,799,306 A | 8/1998 | Sun et al. |
| 6,801,921 B2 | 10/2004 | Tsuchida et al. |
| 6,873,989 B1 * | 3/2005 | Martin, Jr. ........ G06F 17/30306 |
| 6,950,848 B1 | 9/2005 | Yousefi'zadeh |
| 7,386,554 B2 | 6/2008 | Ripley et al. |
| 7,644,087 B2 | 1/2010 | Barkai et al. |
| 7,860,865 B2 * | 12/2010 | Uppala ............. G06F 17/30445 707/737 |
| 7,890,463 B2 | 2/2011 | Romem et al. |
| 8,055,647 B2 | 11/2011 | Takatsuka et al. |
| 8,996,505 B1 * | 3/2015 | Garcia-Alvarado ........................ G06F 17/30442 707/694 |
| 2002/0198872 A1 | 12/2002 | MacNicol et al. |

(Continued)

OTHER PUBLICATIONS

Asplund, John S., Masters Thesis, Michigan Technological University, "Edge Coloring BIBDS and constructing MOELRs" Jan. 2010, 158 pages.

(Continued)

*Primary Examiner* — Anhtai V Tran

(57) ABSTRACT

A system and method for analysis and management of data distribution in a distributed database environment. A method may include analyzing information related to transactions between an application and a plurality of data storage systems to produce analysis results. Analysis results may be used to produce a set of rules for defining logical data chunks. A logical data chunk may include at least a portion a data set stored in the plurality of data storage systems. A data distribution policy may be defined based on the set of rules. Other embodiments are described and claimed.

35 Claims, 8 Drawing Sheets

(56) References Cited

U.S. PATENT DOCUMENTS

| | | | |
|---|---|---|---|
| 2003/0217033 A1 | 11/2003 | Sandler et al. | |
| 2004/0117037 A1 | 6/2004 | Hinshaw et al. | |
| 2005/0021511 A1 | 1/2005 | Zarom | |
| 2006/0129528 A1 | 6/2006 | Miyamoto et al. | |
| 2007/0025351 A1 | 2/2007 | Cohen | |
| 2007/0203910 A1 | 8/2007 | Ferguson et al. | |
| 2007/0288530 A1 | 12/2007 | Romem et al. | |
| 2008/0140696 A1 | 6/2008 | Mathuria | |
| 2009/0012932 A1 | 1/2009 | Romem et al. | |
| 2009/0019007 A1 | 1/2009 | Niina | |
| 2009/0144632 A1 | 6/2009 | Mendez | |
| 2009/0216714 A1 | 8/2009 | Gonzalez et al. | |
| 2009/0248753 A1 | 10/2009 | Tsai et al. | |
| 2009/0271412 A1 | 10/2009 | Lacapra et al. | |
| 2009/0319344 A1 | 12/2009 | Tepper et al. | |
| 2010/0017395 A1 | 1/2010 | Wayn et al. | |
| 2010/0057745 A1 | 3/2010 | Li | |
| 2010/0082540 A1 | 4/2010 | Isaacson et al. | |
| 2010/0088311 A1 | 4/2010 | Du Fosse et al. | |
| 2010/0131490 A1 | 5/2010 | Lamb et al. | |
| 2010/0161593 A1 | 6/2010 | Paulsen et al. | |
| 2010/0161651 A1 | 6/2010 | Cras | |
| 2010/0223562 A1 | 9/2010 | Carapella et al. | |
| 2011/0093499 A1 | 4/2011 | Zhou et al. | |
| 2011/0173219 A1 | 7/2011 | Bent et al. | |
| 2011/0246480 A1* | 10/2011 | Levari | G06F 17/30412 707/747 |
| 2012/0109892 A1 | 5/2012 | Novik et al. | |
| 2014/0101091 A1 | 4/2014 | Brown et al. | |
| 2014/0108421 A1* | 4/2014 | Isaacson | G06F 17/30575 707/747 |
| 2015/0227521 A1 | 8/2015 | Levari et al. | |

OTHER PUBLICATIONS

Faultsich et al., "Implementing Linguistic Query Languages Using LoTos," Nov. 18, 2005, 30 pages.

Pema, "On the Tractability and Intractability of Consistent Conjunctive Query Answering," ACM, Mar. 2011, 7 pages.

Rohloff et al., High-Performance, Massively Scalable Distributed Systems Using the MapReduce Software Framework: The SHARD Triple-Store, Oct. 17, 2010, 5 pages.

Stack Overflow, 'What is the Difference Between Group by and Order by in sql', Aug. 14, 2009. Retrieved Sep. 26, 2012 fromhttp://stackoverflow.com/questions/1277460/what-is-the-difference-between--group-by-and-order-by-in-sql.

U.S. Appl. No. 13/077,523—Advisory Action dated Feb. 6, 2014, 3 pages.

U.S. Appl. No. 13/077,523—Final Office Action dated Nov. 18, 2013, 12 pages.

U.S. Appl. No. 13/077,523—Office Action dated Oct. 8, 2014, 17 pages.

U.S. Appl. No. 13/077,523—Office Action dated Nov. 12, 2015, 24 pages.

U.S. Appl. No. 13/077,523—Office Action dated Jun. 27, 2013, 12 pages.

U.S. Appl. No. 13/077,523—Response to Advisory Action dated Feb. 6, 2014, filed Feb. 18, 2014, 16 pages.

U.S. Appl. No. 13/077,523—Response to Final Office Action dated Nov. 18, 2013, filed Jan. 6, 2014, 14 pages.

U.S. Appl. No. 13/077,523—Response to Final Office dated Apr. 2, 2015, filed Jun. 9, 2015, 10 pages.

U.S. Appl. No. 13/077,523—Response to Office Action dated Oct. 8, 2014, filed Jan. 8, 2015, 6 pages.

U.S. Appl. No. 13/077,523—Response to Office Action dated Nov. 12, 2015, filed Mar. 11, 2016, 8 pages.

U.S. Appl. No. 13/077,523—Response to Office Action dated Jun. 27, 2013, filed Sep. 16, 2013, 12 pages.

U.S. Appl. No. 13/077,526—Final Office Action dated Feb. 14, 2013, 18 pages.

U.S. Appl. No. 13/077,526—Final Office Action dated Dec. 18, 2014, 16 pages.

U.S. Appl. No. 13/077,526—Notice of Allowance dated Apr. 23, 2015, 8 pages.

U.S. Appl. No. 13/077,526—Office Action dated Mar. 13, 2014, 17 pages.

U.S. Appl. No. 13/077,526—Office Action dated Oct. 5, 2012, 17 pages.

U.S. Appl. No. 13/077,526—Response to Final Office Action dated Feb. 14, 2013 filed May 8, 2013, 9 pages.

U.S. Appl. No. 13/077,526—Response to Final Office Action dated Dec. 18, 2014 filed Feb. 25, 2015, 9 pages.

U.S. Appl. No. 13/077,526—Response to Office Action dated Oct. 5, 2012 filed Dec. 24, 2012, 10 pages.

U.S. Appl. No. 13/077,526—Respopnse to Office Action dated Mar. 13, 2014 filed Sep. 15, 2014, 10 pages.

U.S. Appl. No. 14/064,210—Final Office Action dated Jul. 2, 2014, 19 pages.

U.S. Appl. No. 14/064,210—Final Office Action dated Jul. 6, 2015, 21 pages.

U.S. Appl. No. 14/064,210—Office Action dated Feb. 6, 2015, 19 pages.

U.S. Appl. No. 14/064,210—Office Action dated Feb. 26, 2014, 14 pages.

U.S. Appl. No. 14/064,210—Response to Final Office Action dated Jul. 2, 2014, filed Nov. 11, 2014, 10 pages.

U.S. Appl. No. 14/064,210—Response to Office Action dated Feb. 6, 2015, filed Apr. 16, 2015, 11 pages.

U.S. Appl. No. 14/064,210—Response to Office Action dated Feb. 26, 2014, filed May 27, 2014, 9 pages.

U.S. Appl. No. 61/320,575—Provisional Application filed Apr. 2, 2010, 23 pages.

U.S. Appl. No. 61/936,921—Provisional Application filed Feb. 7, 2014, 19 pages.

U.S. Appl. No. 14/834,237—Office Action dated Sep. 22, 2016, 26 pages.

U.S. Appl. No. 13/077,523—Advisory Action dated Nov. 10, 2016, 8 pages.

U.S. Appl. No. 13/077,523—Advisory Action dated Sep. 16, 2016, 3 pages.

U.S. Appl. No. 14/985,277—Preliminary Amendment dated Nov. 18, 2016, 5 pages.

U.S. Appl. No. 13/077,523—Final Office Action dated Jul. 8, 2016, 20 pages.

U.S. Appl. No. 13/077,523—Final Office Action dated Apr. 2, 2015, 17 pages.

U.S. Appl. No. 14/834,237—Response to Office Action dated Sep. 22, 2016 filed Nov. 29, 2016, 8 pages.

U.S. Appl. No. 14/834,237—Notice of Allowance dated Jan. 4, 2017, 14 pages.

U.S. Appl. No. 14/834,237—Preliminary Amendment dated Apr. 19, 2016, 6 pages.

Sen, "Concentrating Row Values in Transact-SQL," https://www.simple-talk.com/sql/t-sql-programming/concatenating-row-values-in-transact-sql/, Jul. 31, 2008, 32 pages.

U.S. Appl. No. 13/077,523—Response to Final Office Action dated Jul. 8, 2016, filed Aug. 11, 2016, 10 pages.

U.S. Appl. No. 13/077,523—Response to Advisory Action dated Sep. 16, 2016, filed Oct. 7, 2016, 12 pages.

U.S. Appl. No. 13/077,523—Response to Advisory Action dated Nov. 10, 2016, filed Dec. 6, 2016, 9 pages.

U.S. Appl. No. 13/077,523—Office Action dated Apr. 11, 2017, 20 pages.

Non-Final Office Action dated Oct. 16, 2018, mailed in U.S. Appl. No. 14/834,237, pp. 1-31.

Response to Non-Final Office Action dated Jan. 23, 2018, as filed in U.S. Appl. No. 14/834,237 dated Jun. 25, 2018, pp. 1-16.

Non-Final Office Action dated Jan. 23, 2018, mailed in U.S. Appl. No. 14/834,237, pp. 1-14.

Request for Continued Examination dated Mar. 28, 2017, as filed in U.S. Appl. No. 14/834,237, pp. 1-3.

Final Office Action dated Dec. 11, 2018, mailed in U.S. Appl. No. 13/077,523, pp. 1-24.

(56) References Cited

OTHER PUBLICATIONS

Response to Non-Final Office Action dated May 7, 2018, as filed in U.S. Appl. No. 13/077,523 dated Oct. 9, 2018, pp. 1-22.
Non-Final Office Action dated May 7, 2018, mailed in U.S. Appl. No. 13/077,523, pp. 1-22.
Request for Continued Examination (RCE) and RCE Submission, as filed in U.S. Appl. No. 13/077,523 dated Feb. 12, 2018, pp. 1-11.
Final Office Action dated Aug. 11, 2017, mailed in U.S. Appl. No. 13/077,523, pp. 1-20.
Response to Non-Final Office Action dated Apr. 11, 2017, as filed in U.S. Appl. No. 13/077,523 dated Jul. 11, 2017, pp. 1-12.
Non-Final Office Action dated Nov. 2, 2018, dated in U.S. Appl. No. 14/985,277, pp. 1-20.

* cited by examiner

Report of Distribution Policy Performance (see Tutorial for this page)

*Finalize Policy Home/Performance Report/Query Detail for Performance Report*

Statement Type Distribution:
29.4% Control statements (set, commit, rollback, etc.)
0.0001% Statements run on nonexistent tables
70.6% Relevant statements
Distribution Reads:
0.7%           Reads run on a single cluster
0.002%        Reads run on a single cluster-Using cascading distribution key resolution
36.7%          Reads run on all clusters
0%              Reads run on all clusters-Using cascading distribution key resolution
12%            Reads run on all clusters-Using advanced CROSS-DB result aggregation
Distribution Writes:
2.1%           Writes run on a single cluster
0%             Writes run on a single cluster-Using cascading distribution key resolution
17.4%          Writes run on all clusters
0%             Writes run on all clusters-Using cascading distribution key resolution
0%             Writes run on all clusters-Using advanced CROSS-DB result aggregation
Global:
0.2%           Global Reads
0.001%        Global Writes

| Open Query Detail for Performance Report |
|---|

Statement Statistic Summary:
1931      Unique Statements (not including restricted and errors)
26665154   Total Statements (not including restricted and errors)

Problematic Statements:
Restrictions
283       Unique Restricted Statements
42        Unique Read Restrictions
241       Unique Write Restrictions
439622   Total Restricted Statements

*FIG. 6*

SYSTEM AND METHOD FOR ANALYSIS AND MANAGEMENT OF DATA DISTRIBUTION IN A DISTRIBUTED DATABASE ENVIRONMENT

CROSS REFERENCE TO RELATED APPLICATION

This application claims the benefit of U.S. Provisional Patent Application No. 61/936,921, filed Feb. 7, 2014, which is hereby incorporated by reference in its entirety.

FIELD OF THE INVENTION

The present invention relates generally to management of distributed data storage. More specifically, the present invention relates to identification and simulation of data distribution policies and classification and management of logically related data chunks and data sets.

BACKGROUND OF THE INVENTION

Databases are used for storing digital data or information. In addition to storing data, modern database systems enable users and applications to search for, and retrieve stored data. Various systems and methods are used in order to improve and provide services. For example, database management systems (DBMSs) are designed to interact with users or applications and provide data storage and retrieval operations.

Horizontal partitioning is a database design or principal whereby portions of data sets, such as rows of a table, in a database are stored separately. As known in the art, a database shard is a horizontal in a. Accordingly, an individual partition in a database may be referred to as a shard or a database shard. As known in the art, shards may be used to partition a large database across a number of servers or partitions. Generally, sharding is used in order to distribute or split data over multiple machines and increase scalability and performance of a database.

However, if a data set is split across a number of shards, when retrieving data from the data set, data from multiple shards needs to be joined, aggregated or merged.

SUMMARY OF THE INVENTION

A system and method for analysis and management of data distribution in a distributed database environment. A method may include analyzing information related to transactions between an application and a plurality of data storage systems to produce analysis results. Analysis results may be used to produce a set of rules for identifying logical data chunks. A logical data chunk may include at least a portion a data set stored in the plurality of data storage systems. A data distribution policy may be defined based on the set of rules. A data distribution policy may include distribution rules for distribution of portions of data in data sets across a plurality of data storage systems. A logical data chunk may be stored in a single data shard. Efficiency scores and metrics for a set of data distribution policies may be generated, presented and provided.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 6 is a screenshot of a display according to embodiments of the present invention;

Figure 1:
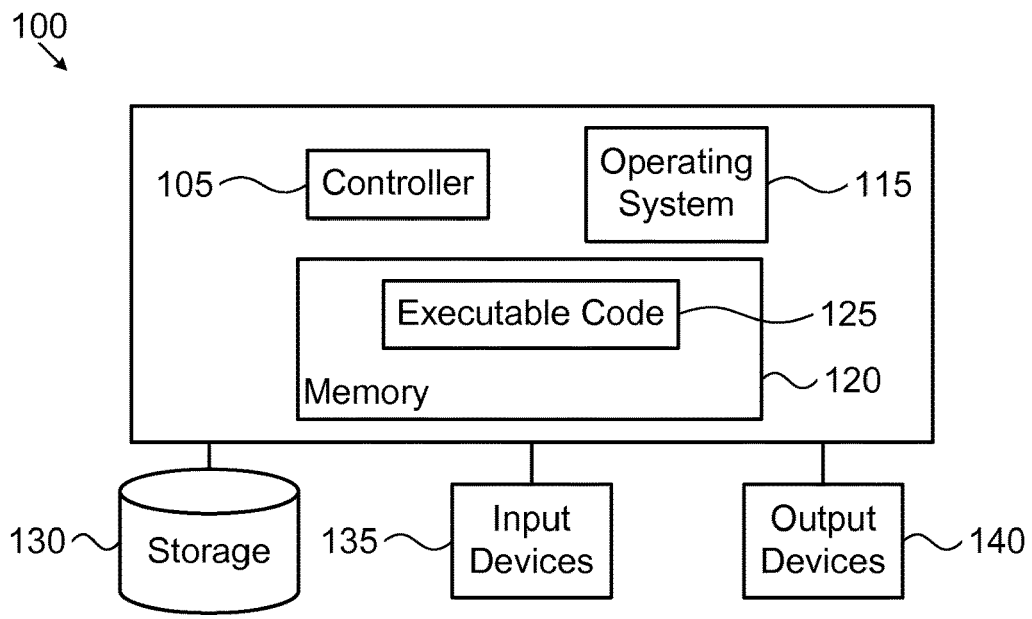
FIG. 1 shows high level block diagram of an exemplary computing device according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A system and method according to embodiments of the invention may analyze information related to databases and transactions between an application and a plurality of databases and produce analysis results, analysis results may be used to identify a plurality of data storage rules of logical data chunks, e.g., portions of related data in a plurality of data sets, that are accessed, retrieved or stored by the application or database. Analysis results may be used to identify and suggest a data distribution policy for data distribution and management in a horizontally partitioned database. The analysis results may be used to simulate data distribution policies, patterns or scheme and calculate a data distribution efficiency score and produce data distribution simulation report.

Reference is made to FIG. 1, showing a high level block diagram of an exemplary computing device according to embodiments of the present invention. Computing device 100 may include a controller 105 that may be, for example, a central processing unit processor (CPU), a chip or any suitable computing or computational device, an operating system 115, a memory 120, an executable code 125, a storage 130, input devices 135 and output devices 140. Controller 105 may be configured to carry out methods described herein, and/or to execute or act as the various modules, units, etc. More than one computing device 100 may be included, and one or more computing devices 100 may act as the various components, for example user computer 210, analysis assistant (AA) 215 and analysis generator (AG) 225 may each be, or include components of, computing device 100.

For example, a system described herein may be, or may include components of, computing device 100. For example, by executing executable code 125 stored in memory 120, controller 105 may be configured to carry out a method of identifying, simulating, defining, and/or presenting a policy as described herein. By executing executable code 125 stored in memory 120, controller 105 may be configured to cause a multi-server database to store data according to a policy as described herein. For example, controller 105 may be configured to analyze information related to transactions between an application and a plurality of data sources to produce analysis results and use the analysis results to simulate a policy as described herein.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that identifies or simulates a storage policy and/or causes a database to store content according to a policy as further described herein. Although, for the sake of clarity, a single item of executable code 125 is shown in FIG. 1, a system according to embodiments of the invention may include a plurality of executable code segments similar to executable code 125 that may be loaded into memory 120 and cause controller 105 to carry out methods described herein. For example, units or modules described herein (e.g., computer 210, AA 215 and AG 225) may be, or may include, controller 105 and executable code 125.

Storage 130 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content may be stored in storage 130 and may be loaded from storage 130 into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105.

Some embodiments may be provided in a computer program product that may include a non-transitory machine-readable medium, stored thereon instructions, which may be used to program a computer, controller, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Figure 2:
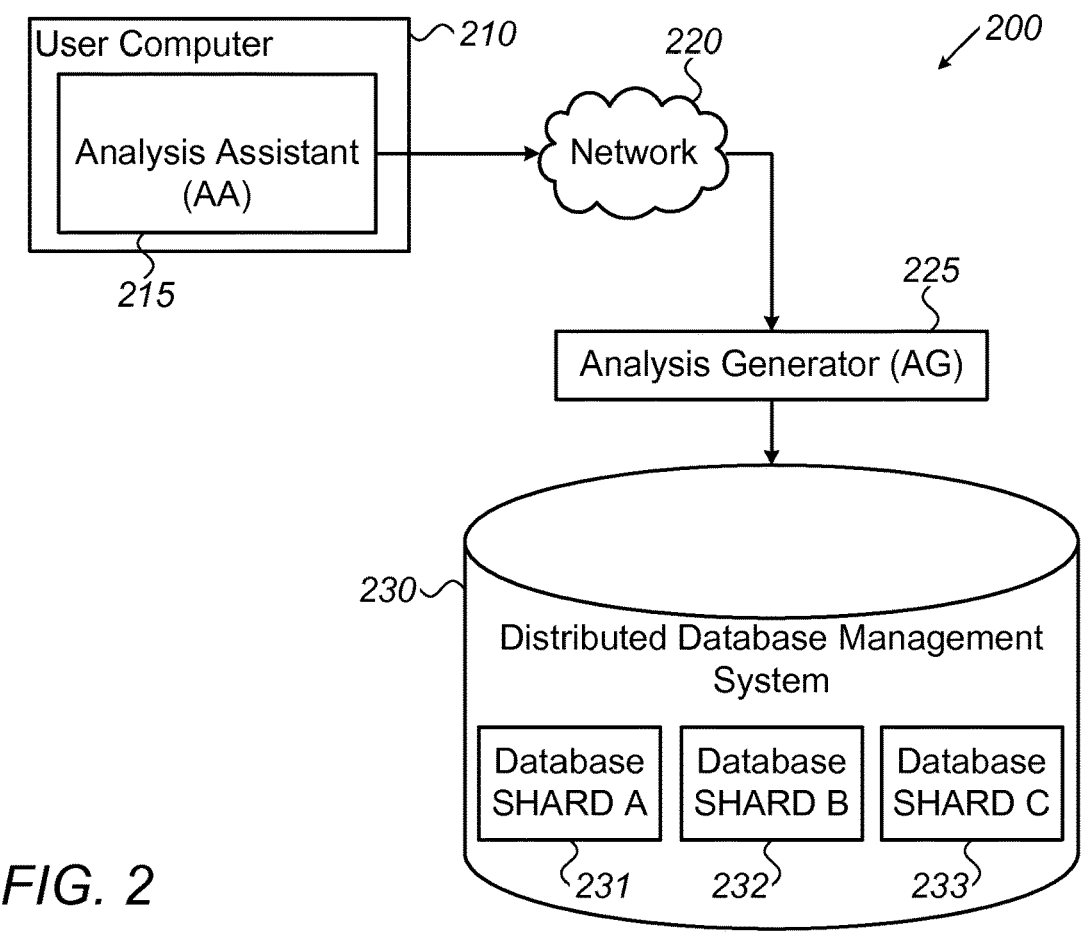
FIG. 2 is an overview of a system according to embodiments of the present invention.

Reference is made to FIG. 2, an overview of a system 200 according to some embodiments of the present invention. As shown, system 200 may include a user computer 210, an analysis assistant (AA) unit 215, a network 220, an analysis generator (AG) 225 and a database 230. As shown, database 230 may include shards, e.g., shard A 231, shard B 232 and shard C 233. Although shards are mainly discussed herein it will be understood that the present invention is relevant to other components in a database. For example, in addition to (or instead of) shards, servers may be used, and identifying, simulating or managing a distribution of data may be performed as described herein with respect to servers as well as shards.

AA 215 may collect data related to an interaction with database 230. For example, any data or requests sent from an application on computer 210 to database 230 may be collected by AA 215. AA 215 may send collected or other data to Analysis Generator (AG) 225 over network 220. AG 225 may identify a distribution of data stored in database 230 based on an analysis of data received from AA 215. AG 225 may present to a user various aspects of a distribution of data stored in database 230, may simulate distributed storage of data in database 230 and may enforce a selected distributed storage policy such that data in database 230 is stored according to a selected policy.

A system and method according to some embodiments of the invention may identify, qualify efficiency and manage data distribution policies for distribution of data among a number of databases, servers or shards according to a data distribution policy. A data distribution policy or storage distribution policy (also referred to herein as distribution policy) may include rules, criteria, thresholds or scheme usable for deciding where or how to store a data element in a storage system. As described, a system and method may create a distribution policy and may save the distribution policy in a file. For example, AG 225 may use information provided by AA 215 and information obtained from database 230 to create a distribution policy. AG 225 may store (e.g., in a file in database 230) and/or provide a distribution policy to be used for database 230. For example, a distribution policy may dictate that a first set of rows (e.g., rows 1 to 17) of a table will be stored in shard A 231 and a second set of rows (e.g., rows 18 to 42) of the table will be stored in shard B 232. Rules in a distribution policy may be formatted based on distribution keys. For example, using distribution keys as described in U.S. patent application Ser. No. 13/077,526, a distribution policy may be defined by associating tables' rows or columns with distribution keys and values as described.

The phrases "data set", "data entity" and the term "table", as used herein, may relate or refer to the same entity, and may be used herein interchangeably. For example, in an embodiment, a data set is a table.

As described, a system and method may collect data for analysis, reporting, identification, optimization and simulation of (or for) a data distribution policy.

The term "database" as referred to herein may relate to any applicable database as known in the art. For example, a database may be a relational database or relational database management system (RDBMS), such as MySQL database, or a database may be a Non-Relational Database Management System, e.g., Object, Graph or Xml based database management systems as known in the art.

The term "database cluster" as referred to herein may relate to a plurality of databases, database systems or database units that store same or similar data elements or data structures. For example, a database cluster may be a set of databases, servers or shards operated together to provide redundancy and high availability or additional features and benefits as known in the art.

The terms "distributed database", and "distributed database management system" as referred to herein may relate to a system for enabling and managing horizontally partitioned database, enabling and managing distribution of data across a number of databases or database clusters, where each may be considered as a database shard holding part of the total available data and together holding all available data. A distributed database typically enables and manages access to the data that is distributed across number of database shards.

The terms "foreign key" as referred to herein may be, or may relate to, a field (or collection of fields) in one table that uniquely identifies a row of another table. In other words, a foreign key may be a column or a combination of columns that is used to establish and enforce a link between two tables.

Shards and distributed database management system may be as described in U.S. patent application Ser. No. 13/077,526 by Doron Levari entitled "SYSTEM AND METHOD FOR INTERACTION WITH A PLURALITY OF DATA SOURCES" which is hereby incorporated by reference. Join operations may be as described in U.S. patent application Ser. No. 14/064,210 by Noam Asner entitled "SYSTEM AND METHOD FOR ANALYSIS OF A DATABASE PROXY" which is hereby incorporated by reference.

The term "data distribution policy" as referred to herein may include, or may be related to, a set or list of logical rules and distribution keys that may be used to distribute data in a distributed database to identify, define and/or set a distribution policy, a system and method may identify a structure of a database, the size of data entities or elements and access patterns. For example, a system and method may identify, determine and/or set database metadata structures, relationships between data entities, such as tables. Other elements that may be identified may be foreign keys and stored object definitions. A system and method may analyze transactions between an application and a database (e.g., queries or requests) and identify loosely coupled relationships between data elements or entities in the database. Other aspects, e.g., data tables sizes, data access patterns, including, but not limited, to amounts of reads and writes to each data entity or table may also be identified, recorded and used in identifying and selecting a policy.

In an embodiment, a data distribution policy may be based on identifying and classifying the distribution type and defining a distribution key of data tables stored in a database. A distribution key may be as described in U.S. patent application Ser. No. 13/077,526.

A table type classified as distributed table may include or be related to a distributed table that may be a table who's data is distributed across several database shards in a way that no two database shards share or store the same rows for the table. The table may share the same structure on all clusters but the data is split between clusters or shards without any overlaps. Tables that are the best candidates for being distributed are typically those containing large amount of rows, or tables that are subject to many write operations. Since each shard contains only a fragment of the data, write operations (including index updating) are much faster than of those of a single database. Splitting a large database to shards thus ensures true linear scalability for write operations.

The distribution of data may be done according to a data distribution key which, as describe in the referenced patent application, may be a field in a table and a distribution rule that may be range-based (e.g., for a controlled distribution) or hash-based (e.g., for a random distribution).

A distributed-cascaded table may be a table that is distributed across several database shards in a way that no two database shards share the same rows of the table (e.g., in a similar way as described for a distributed table). However, a distributed-cascaded table may also contain a strong relationship to a parent distributed table, depending on a row-column values and distribution of the parent table. A system and method may use attributes of distributed-cascaded tables to provide additional options for managing distribution of data sets in a distributed storage system.

A global table may be a table that is copied or replicated to all shards. Global tables are usually smaller size tables which are used in "join" operations with distributed tables. Global tables are typically only infrequently updated. Global tables may be frequently accessed in statements and transactions alongside with distributed tables, allowing completing queries and transactions can complete using a single shard.

A master table may be a table that is maintained only on one primary (master) shard. Master tables generally only hold metadata or peripheral data with no significant volume of data or session concurrency. Additional table types may be defined and identified.

An embodiment of a system or method may assist to scale out a database by splitting it into smaller databases, or shards, to evenly distribute workloads across multiple machines. An embodiment of a system or method may ensure that database sessions are evenly distributed between shards. A system or method may assist to distribute data of a single database across multiple geographically distant machines, enabling a geo-distributed database. An output of a system or method may be a set of distribution keys that assure that data that is frequently accessed together is also distributed together for optimal scalability, performance and avoidance of cross-shard and unsupported operations. Using keys for distributing a data set (e.g., a table) may be as described in U.S. patent application Ser. No. 13/077,526.

An embodiment of a system or method may ensure evenly distributed sessions by ensuring the data is distributed such that queries and transactions can complete using a single shard, thus achieving high performance and scalability. An embodiment of a system or method may cause all data that is typically accessed together in the same transaction or query to be stored together, e.g., in the same shard and ensures that a specific transaction/query is completed within a specific, single shard.

An embodiment of a system or method may be non-disruptive for existing or running applications and databases, requiring or causing no service outages and none or negligible performance penalties. An embodiment of a system or method may assist with an analysis of the state of the non-distributed database environment, provide information about its readiness to perform a transformation process into a distributed database environment and assist with decision making process by identification of data growth patterns and predictive analytics. An embodiment of a system or method may assist with continuous monitoring and predictive analytics of a non-distributed databases and of a distributed database.

A system and method according to embodiments of the invention may include or enable analysis of existing application's statements, such as but not limited to system query language (SQL) queries or JSON queries as known in art, database schemas structures, other database characteristics or any other data generated or sent by an application to the database (e.g., queries and requests sent from the application), together referred to herein as application data. Based on an analysis of application data, a data distribution policy may be defined. In an embodiment, impacts of the data distribution policy on existing business or other applications' code may be minimal.

Analysis of data used, generated or sent by an application may include analyzing data related an application's Structured Query Language (SQL) statements and schema. For example, a database schema may be a set of tables, e.g., a collection of related tables or other data structures used by (and/or stored for) an application. Based on analysis of collected data, an optimal distribution policy may be defined. For example, a distribution of data in a table across a number of databases or shards may be defined based on an analysis of SQL requests generated by an application such that SQL requests generated by an application are served from a minimal set of databases or accessing a minimal set of storage units.

Data collection may include collection of statements (e.g. SQL requests, queries or messages) by a collection unit that may be, for example, AA 215, or AG 225 described herein. In other cases, a network sniffer may be used to capture traffic between an application and a database, or a log file (e.g., MySQL general log) may be used or database proxy unit may be used as known in the art.

Collection of data may be performed over several hours, several days, or may be performed in a continuous, low-overhead manner. Data generated by an application may be used in order to determine a full spectrum of statements that an application sends to a database. Collection may be performed such that a full coverage of the application's functionality and all "types" of its statements are represented in the collected data. A system and method may further collect information related to a database's metadata structure, data tables' sizes and database server's characteristics.

Collected data may be or may be related to: online business transactions, daily/weekly maintenance procedures, batch data processing, business reporting etc. The time spent for collection of data may be predefined or automatically defined. Typically, a few hours of data should provide sufficient coverage, but they may be stretched across several time periods over 24 hours or several days. In an embodiment, newly collected data may be compared (e.g., by AA 215 or AG 225) to previously collected data and collection process may be automatically terminated upon determining, (e.g., by AA 215 or AG 225), that sufficient coverage was reached, e.g., newly collected data does not enrich the already collected data (and therefore it may be assumed that data already collected adequately covers the scope of data generated by the application). A collection process (e.g., in AA 215) may be interrupted (e.g., by AG 225) and restarted to cover non-continuous time intervals.

In an embodiment, an AA 215 may automate a data collection. In an embodiment, AA 215 may pre-process collected data to minimize the size of files that store the collected data. In an embodiment, AA 215 and/or AG 225 may obfuscate, encrypt or normalize collected data in order to eliminate a risk of exposing sensitive or protected information.

An analysis of collected data may be directed to optimizing flows. A flow may be or may include a number of transactions, requests or queries. For example, if an application typically requests an employee table from a database after requesting the department table then a system or method may identify (or define) the two requests as a flow.

To improve interaction with a database, requests generated by an application may be analyzed to determine the resources accessed in order to serve the requests. Based on the analysis, a data distribution policy that is optimized for application's database schema, transactions and business needs is generated or defined. For example, with respect to the employee and department tables example, a system and method may define a policy that dictates storing the portion of data relevant to a certain employee in an employee table and portion of data relevant to a certain department in a department table on the same shard such that a flow only requires accessing one single shard.

In an embodiment, AA 215 may be an agent module running on a user's system (e.g., user computer 210). In an embodiment, AA 215 may operate in a non-disruptive manner, enabling it's activation in any environment, including product, testing and development environments, requiring or causing no service outages and none or negligible performance penalties. Although shown included in user computer 210, AA 215 other configurations may be contemplated. For example, AA 215 may be, or may be installed in, a network device or in a server, e.g., a server that hosts AG 225. AA 215 may be activated on a database host (e.g. database server) or the client host (e.g. application server) and collect application data using a tapping unit, such as network sniffer unit or a transparent proxy network unit as known in the art. Application data may be any data generated and/or sent by an application, e.g., an application running on user computer 210. For example, queries or requests sent to database 230 may be captured by AA 215 and included in application data. Accordingly, it will be understood that any information communicated between user computer 210 and database 230 may be available to a system and method according to the invention.

AA 215 may capture any relevant information on the user's environment or computer. AA 215 may generate data, for example, AA 215 may generate lists of files or objects requested (by a user) from a database and may further store sizes of requested objects etc. Any information collected, generated and stored by AA 215 may be provided to AG 225.

AA 215 may capture or generate information that may include, but not limited to, these classes of data: statements, tables' sizes, database tables' metadata structure and database server's characteristics and metrics. These classes of data are collectively referred to herein as application data. Application data as referred to herein may include additional information, e.g., time values, software versions and the like.

AA 215 may capture or generate a list of application-to-database commands with statistics such as quantity, percent and response time. For example, the application-to-database commands for which data may be captured or generated and recorded may be SQL queries. Collected and generated data may be processed. For example, captured SQL or other commands may be obfuscated, normalized and encrypted.

Commands, transactions, requests or queries captured may be processed and a normalized or standardized version may be created. For example, clauses' values (or literals or expressions in commands) may be replaced by predefined values, e.g., "1", "2" and so on, to create a template (normalized or standardized version) that is applicable to all "similar" commands. Using a normalized template, statistics may be generated and kept, e.g., frequency, percent out of an entire workflow. Examples of a template or a normalized or standardized version generated by processing commands, transactions or messages are shown below, obfuscated data is underscored in the examples below. In the below example related to a select statement, the table and column names are real, but the original value of the literal in the "where" clause has been replaced with 'str1'.

```
select*from item_index_info where
    index_key='str1';
```

In the below example related to an insert statement, the table and column names are original, but the inserted bits of data have been replaced with trivial substitutes in the process of obfuscation.

```
insert into target_url_info
    (domain_id, first_date_timestamp, link_key, target_id,
    partner_domain)
values
    (1, 2, 'str1', 3, 'str2'), (1, 2, 'str1', 3, 'str2');
```

A system and method may collect (e.g., by AA 215 or AG 225) the numbers of rows and size on disk per table. This information may be used by a system or method to optimize distribution for tables that can benefit from it the most. A list of tables and their sizes may include no actual information about the data in the tables, e.g., the list may be metadata related to the tables. For example, metadata may include tables' or data sets' names, structural definitions of data sets, sizes etc.

Generally, a schema structure may include any information related to a tables in a schema, tables' structures, e.g., the fields in a table, foreign key relations, special database objects, such as data views, stored procedures, stored objects and additional database and schema definitions and configuration settings. For example, a schema may include data generated by a Data Definition Language (DDL) as known in the art (e.g., as described in). For example, using DDL, a system (e.g., AG 225) may obtain from database 230 any information related to tables structure.

AG 225 may receive, from AA 215, data collected by AA 215, analyze the received data and use the analysis results to create reports and to define and create a data distribution policy such that interactions of an application with a database are optimized. The data may be collected and processed (e.g., summarized or normalized) and may then be provided to AG 225, e.g., periodically or continuously, over network 220.

AG 225 may store application data, distribution policies and other information in a database, e.g. in an internal database. AG 225 may identify logically related data chunks and data distribution policies for classification and management of logically related data chunks and data sets in a single-database or in a distributed multi-database environment. A logical data chunk may be data related to a plurality of portions of data stored in plurality of related data sets, such related data tables. For example, a logical data chunk may be, or may include, all relevant information related to a specific user and a specific user activities (e.g., a user's profile in a social network). In another case, a logical data chunks may be, or may include details related to transactions (e.g., personal, transactions and/or historical transactions) related to a specific bank account in a banking system. Any logical entity may be defined (e.g., user, company, application etc.) and data related to a logical entity may be included in an associated logical data chunk.

A logical data chunk may be portion of data stored in one table (or data set) or it may be portion of data stored in several tables or data sets. Data sets or tables storing data portions of logical data chunks are considered (and referred to herein) as related or linked tables. A system and method according to embodiments of the invention may identify list of groups of related data tables and data sets, and list of rules, such as table's column-rows keys, for identification of data within these data tables and data sets for each logical data chunk. A list of groups and rules may be used for defining data distribution policy. The data distribution policy may be used for optimal data distribution in a distributed database. Data distribution may be considered when groups of related data for a logical data chunk may be stored in the same database, shard or server.

A relation or link, between two data sets, such as database tables, may be uniquely identified by the combination a datasets identification and a property name in each of the data sets, e.g., columns in tables. Additional properties may be the other data sets that it refers to (can be self-reference). In order to analyze or determine how data is stored in a database and used by an application or user, a system and method may identify a set of related tables, e.g., a set of tables typically accessed together, at the same, or with relation to the same command or request.

A system and method may use the collected static data, such as database metadata or tables' structure, collected dynamic data, transactions and statements and SQL commands to determine relations between data sets (e.g., tables in a database). Relations (or links as referred to herein) may be stored in a database. For example, by analyzing information provided as described, AG 225 identifies related tables, defines rules for identification or related portions of data, such as table rows or records, in a plurality of data sets, together combining as logical data chunk. Such rules are referred as data distribution policy, or distribution policy, and may be used for management of storage and access in a distributed database 230.

For example, to identify related tables, AG 225 may analyze commands or requests and may determine that two tables are related if both tables appear together in a request. For example, if an employee table and a department table are both referred to in a request (and therefore, both need to be accessed in order to generate a response) then AG 225 may determine the employee table and the department table are linked. Linked tables may be included in a logical data chunk, for example, the employee and department tables may be included in a logical data chunk. Join operations may be an indication of related data sets or tables. For example, if in order to generate a response for a query or command, data from a first and second table needs to be "joined" then AG 225 may determine the first and second tables are linked and may include them in a logical data chunk. As described, using the referred distribution policy a logical data chunk may be identified and stored in a single shard. For example, records for a specific employee in an employee table and records on specific department in a department table may be identified as part of a single logical data chunk and cause storing data and accessing data the for the specific employee and department in the same shard.

Commands patterns may be identified by AG 225. By analysis of information as described, AG 225 may identify, in a captured command stream, patterns of commands frequently appearing together. For example if the commands "get department" and "get employee" appear 200 times over the flow, a system may determine there's a relation or a link between the employee and department tables. As described, upon determining two or more tables are linked or related, AG 225 may include the tables in a logical data chunk and cause defining relations between the tables for storing relevant portions of data in each table of the logical data chunk in a single shard.

A foreign key may be a field (or collection of fields) in one table that uniquely references or identifies a row in another table. For example, a foreign key may be a column or a combination of columns in a first table that is used to establish and enforce a link to a second table (thus linking the two tables). For example, a foreign key may be identified using DDL as known in the art. Based on a foreign key in a first table that reference a second table, AG 225 determine the tables are linked, may include the tables in a logical data chunk and may cause the logical data chunk to be stored in a single shard.

AG 225 may include tables or data sets based on name matching. For example, AG 225 may include tables in a logical data chunk based on tables' names and tables' columns names or table fields with similar names. For example identifying a field "department_id" in the employee table, a system and method may determine there is a relation between an employee table and a department table. A system or method may receive, from a user, further information about additional relations between tables as well as accept override action for the automatically identified relations. For example, a graphical user interface (GUI) may be provided to a user enabling the user to define or create 1 logical data chunks, delete logical data chunks and so on.

AG 225 may produce analysis results and may store the analysis results, e.g., in a file in an internal database. Analysis results may be used to define a distribution policy as described. For example, based on the analysis results that indicate two tables are typically accessed in related transactions (e.g., in requests from a specific, same user), a distribution policy may cause storing the two tables on the same shard. Analysis results may be used to generate and present a report.

Figure 3:
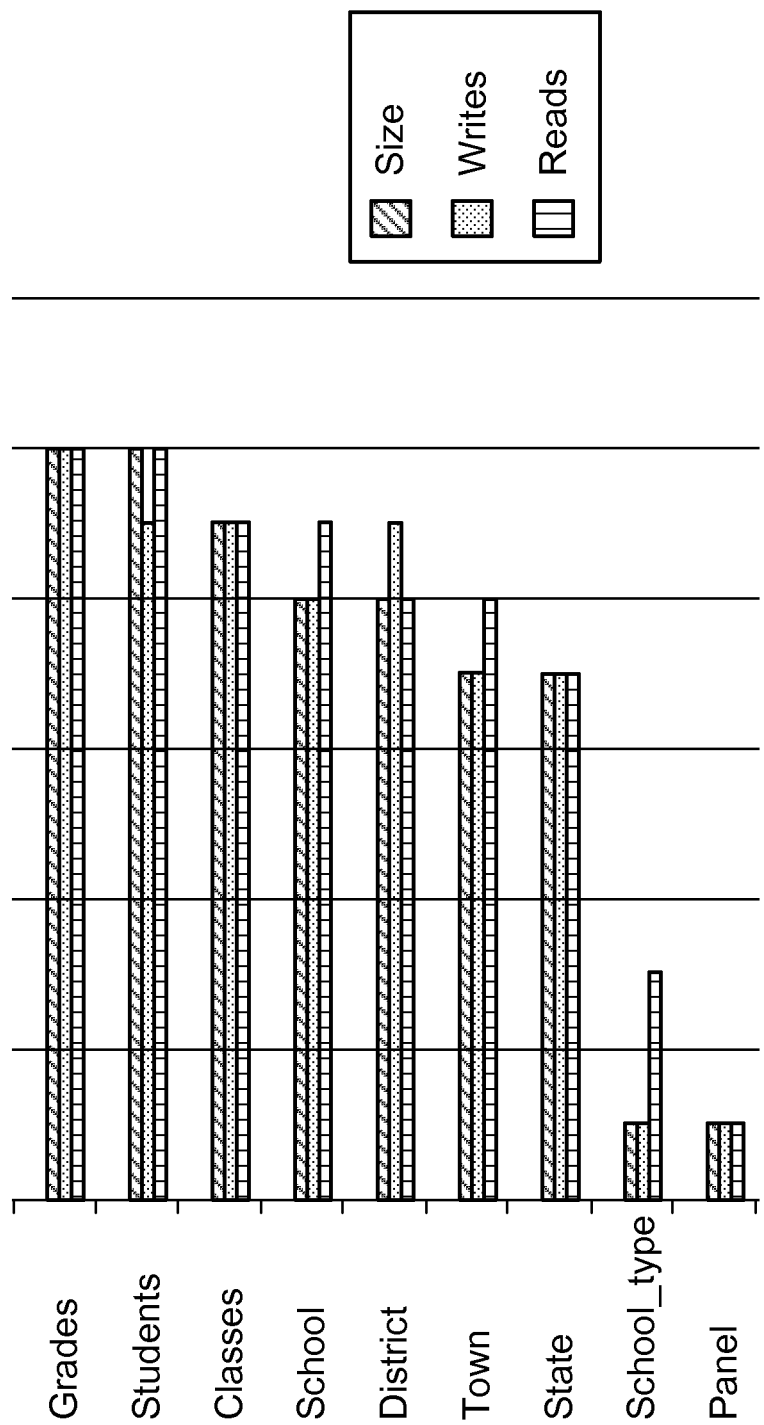
FIG. 3 is a screenshot of a display according to embodiments of the present invention.

Reference is made to FIGS. 3-6, that show screenshots of exemplary reports, statistical and other information that may be graphically presented by a system and method according to embodiments of the invention. For example, AG 225 may produce (based on the analysis results and/or other data) an initial report. As shown in FIG. 3, an initial report may include and show (e.g., on a monitor of user computer 210) various operational aspects of database 230. For example, a report may include schemas statistics summary, e.g., per each schema, statistical and analytical information may be presented, e.g., number of tables accessed, number of read operations, number of write operations, number of statements that include "joins" etc.

A report may include problematic objects, e.g., tables for which AG 225 did not collect enough data in order to present reliable information. Problematic objects may be tables or data sets that will be too small for their intended use if the current distribution scheme or policy are maintained. Problematic objects may also be database views, stored functions, stored procedures and additional database objects.

Figure 4:
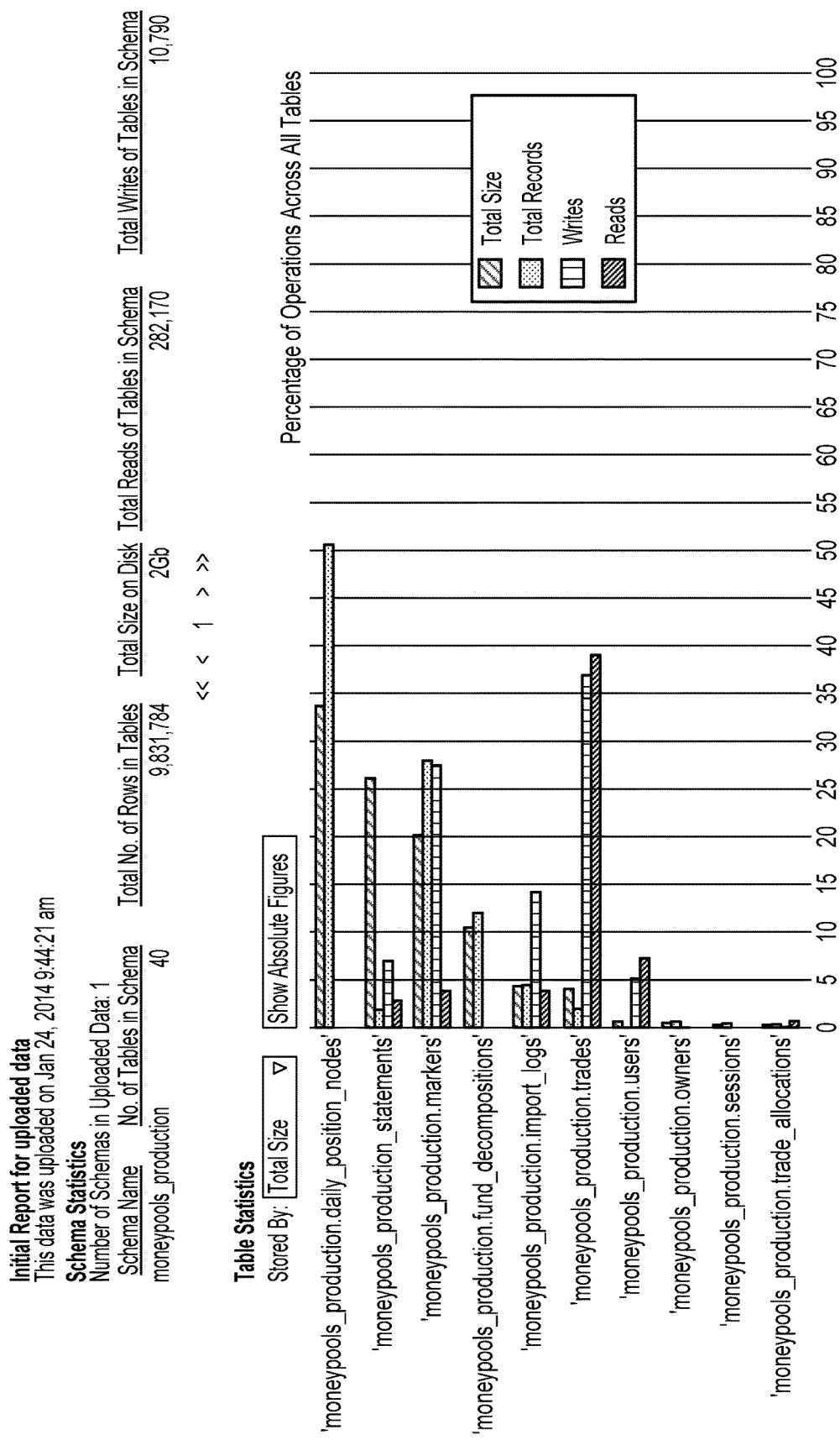
FIG. 4 is a screenshot of a display according to embodiments of the present invention.
Figure 5:
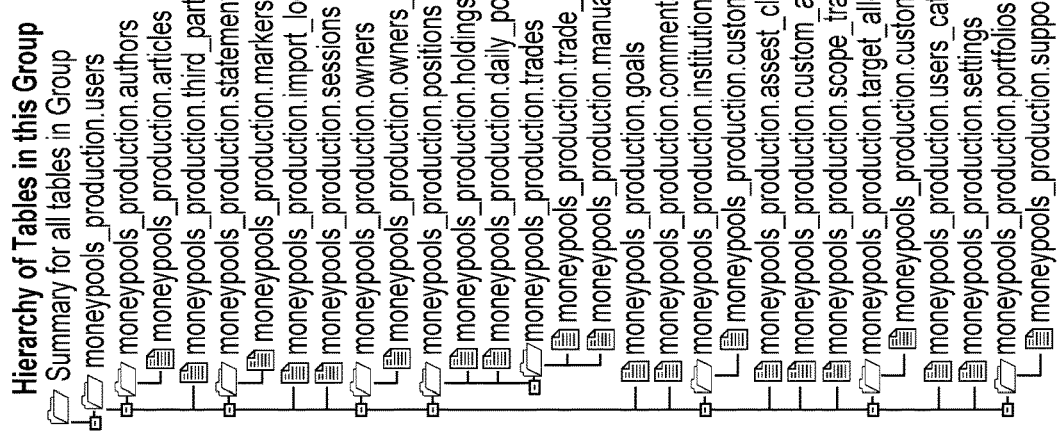
FIG. 5 is a screenshot of a display according to embodiments of the present invention.

A report may include information related to table relationships. For example, a report may include the number and attributes of detected foreign keys (e.g., with an indication of whether or not a key is expected), detected name matching links (links made based on name matching as described) and detected links via joins. As shown, a report may include schemas and tables statistical or other information. A system may graphically sort or graphically filter presented statistical data (e.g., as shown in FIGS. 4-6) based on one or multiple parameters such as: Size of data, Writes, Reads, referenced in joins, referencing joins, ratios of data reads to data writes and additional parameters.

As system and method may enable a user to perform actions. For example, a user may define, change or otherwise manage a distribution policy, e.g., in order to optimize a distribution policy. For example, a user may add, delete or modify relationships between tables, adjust expected sizes of tables and read/write statistics per table, modify schemas and tables definitions. A user may indicate an intent to use one or multiple rules out of set of rules for defining the distribution policy. The distribution policy may be used for storage of logical data chunks "together" on the same shard or otherwise optimize operations with the group of tables.

AG 225 may generate, present and provide an initial or suggested data distribution policy or grouping based on the analysis results and a user may accept or modify one or multiple definition parts in the suggested list of groups of related data sets, the suggested set of rules and the suggested data distribution policy. AG 225 may enable a user to define multiple groups, possibly overlapping each other. Some tables may be ungrouped automatically, e.g., by AG 225 if a conflict is found. A user may provide input to cause modification of distribution prioritization for each table in each database schema.

AG 225 may generate or define a data distribution policy based on a scoring. For example, a score for a possible distribution (or distribution policy) may be calculated based on a simulation of potential data distribution and distributed data access, based on the distribution policy, the submitted and analyzed application data, such as transactions and statements, the data set structures, sizes of data sets being accessed or processed, number of reads, writes, joins etc.

A report may include selective statistics per each defined group, applying various filters such as tables with specific relations, or tables with reads to writes calculated ratio, or distributed cascaded tables, or transactions and statements of various specific nature. A report may include a list of possible roots in each group and how their children (e.g., related or linked tables) cover each group. Using a GUI tool, a user may select "sharding roots" (e.g., select a root for a shard) and incrementally build the policy. For example, a user may choose which groups or subgroups become cascaded trees. For example, a user may review tables that are not connected to any root and decide how to distribute them.

Using a GUI tool as shown in FIGS. 4-6, a user may indicate what to do with problematic objects or links, e.g., ignore, change rule in a policy. Other operations that may be provided by a system may be editing a graph (a visualized policy), acknowledging or accepting a name matching relation, delete or add name matching fields or rules and saving a report, e.g., in a file on database 230.

A user may be enabled to select tables or data chunks that will reside on the same database or shard. For example, using a report and seeing which data chunks are typically accessed at the same time or context (or are otherwise related), a user may add a configuration, policy or grouping of related logical data chunks or tables and based on a grouping or association of data chunks, a system may store associated data chunks on the same server, database or shard.

Using a graphical interactive report as described, a user may be enabled to group related tables, even if there is no specific relationship parent table. If the user picks two or more groups, a system or method may indicate conflicting tables, e.g., tables belonging to more than one group. A system may show or otherwise indicate to a user the types and amount of SQL queries' joins that a particular table has with other tables from other groups.

A group as referred to herein may be a set of tables that have relations between them. A group may be a hierarchical tree including many tables, with many levels, "glued" by relations. A group may have a root table, with directly related tables to it, and related tables that are related to those tables as a second level relationship and so on.

As shown in FIG. 5, groups (or trees) may be graphically presented to a user. Additional statistics generated by a system and method described herein are shown. For example, percent of all reads and writes and rows from the overall captured workload that is using those tables. Also shown are determined relations that are inside this group (between tables participating in this group) and outside this group (between tables in this group—to tables in other groups). In an embodiment, a table can belong to one and only one group.

A report may include drill down information. For example, a report may include drill down to every column that shows which tables are shard tables, which are global, show what comprises the statistics (e.g., first drill is to tables, second is to SQL commands on that table, or first drill is directly to the SQL commands), what are the relevant restrictions.

A report may include alternate paths between tables may be shown. For example, multiple relations. A user may be enabled to mark legal and illegal (accepted or rejected) relations between tables or data chunks (e.g., indicate ones that are to be stored cross shard)

A report may include an indication of tables that are not included in any group. A user may be enabled to edit tables and relations. A user may be enabled to Export/Import any portion of a report (e.g., to CSV format).

Information related to tables may be extracted from a report. For example, tables and table relations metadata or information may be extracted and presented in various output options, such as a tabular as shown below.

| Schema | Table | PK | Row count | Size | SELECT rank | DML rank | Overall rank | User priority |
|---|---|---|---|---|---|---|---|---|
| | | | | | | | | |
| | | | | | | | | |

Tabular views may include different colors for different relation types, graphic maps and the like. Actions on, or related to the table above may include: prioritization of a table, editing of row details, sort by any table field and drag and drop operations as known in the art.

Another exemplary Tabular view is shown below.

| Schema | Table | PK | Row count | Size | SELECT rank | DML rank | Overall rank | User priority |
|---|---|---|---|---|---|---|---|---|
| | | | | | | | | |
| | | | | | | | | |

Actions on, or related to the table above may include: removing "name matching" relations (e.g., reject wrong matching), adding relations (e.g., missed by AG 225), assign a priority to a relation, edit row details and sort by a field. User input may override an analysis result, and a distribution policy may be generated based on a combination of analysis results and user input where, if a conflict between analysis results and user input is detected, user input is used. Tables, policies and any other information described herein may be stored, exported or otherwise used as known in the art.

A report may show all tables for which data is missing or classification was not complete, sorted by score, and allow actions such as: choose to leave a table as global table, link a table to a distributed or distributed cascaded tables hierarchy, or change table type to a distributed table type, thus creating a new logical data chunk and group hierarchy, or change a table type to become a master table. A system may identify impacts of the change on the analyzed statements and transactions and provide relevant information or warnings about the data distribution and data access implications of this change. For example, a change may cause a data access that will require joins of portions of data stored in a table on one shard with data stored in another shard, known in art as cross shard data aggregation, thus creating less efficient data access. Any other operation that may cause modification of a data distribution policy may be enabled.

A method and system may simulate (and present a simulation) of a data distribution policy, based on the identified and configured relationships, and without the need for the actual database and actual application. A method and system may present a report of the simulation revealing the effectiveness and efficiency of the data distribution policy, based on the collected application data and the analyzed and configured groups.

A simulated report may include a list of list of operations that can be run with maximal efficiency, in parallel, on multiple data shards, a list of operations requiring basic aggregations, a list of operations requiring cross-shard operations and/or a list of operations that cannot be executed in a distributed database management system (a sharded database).

As shown by FIG. 6, a report produced and presented by AG 225 may show or contain distribution or percentages of statement type elements such as control statements (set, commit, rollback, etc.), statements run on nonexistent tables, relevant statements. Other data presented may be related to read operations, e.g., reads from a single cluster, reads from all clusters, reads using cascading distribution key resolution or reads using advanced cross-database result aggregation (reads requiring more than one database).

Other data presented may be related to write operations, e.g., writes run on a single cluster, writes to a single cluster using cascading distribution key resolution, writes to all clusters, using cascading distribution key resolution, using advanced cross-database result aggregation etc.

Other data presented may be related to statement statistics, e.g., unique statements total number of statements and problematic statements. Other data presented as shown may be numbers of unique restricted statements, unique read restrictions, unique write restrictions, total restricted statements, read restrictions, total write restrictions, unique error statements and total error statements etc.

Figure 7:
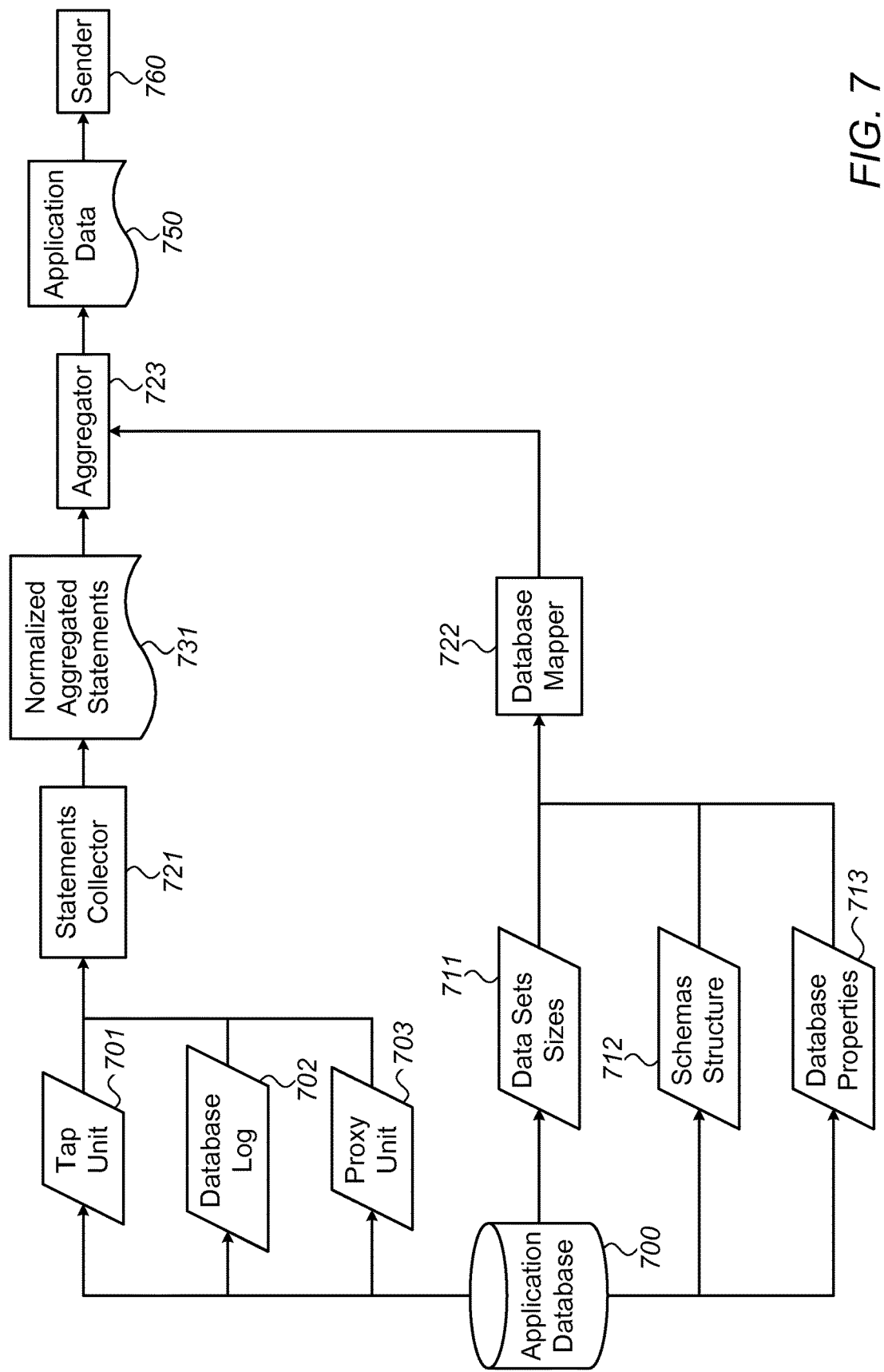
FIG. 7 shows a flowchart and components of a system according to an embodiment of the present invention.

Reference is made to FIG. 7 that shows a flowchart and components of a system according to an embodiment of the present invention. Generally, the components shown in FIG. 7 may be included in AA 215. As shown, a tap unit 701, database log 702 and/or proxy unit may provide data related to transactions to a statements collector 721 that may produce normalized aggregated statements 731. As shown, normalized aggregated statements 731 may be provided to an aggregator 723. As further shown, data sets sizes 711, schemas structures 712 and database properties 713 may be collected by a database mapper 722 and provided to aggregator 723. As shown, application data 750 produced by aggregator 723 may be sent by a sender unit 760. For example, sender unit 760 may send data to AG 225.

Figure 8:
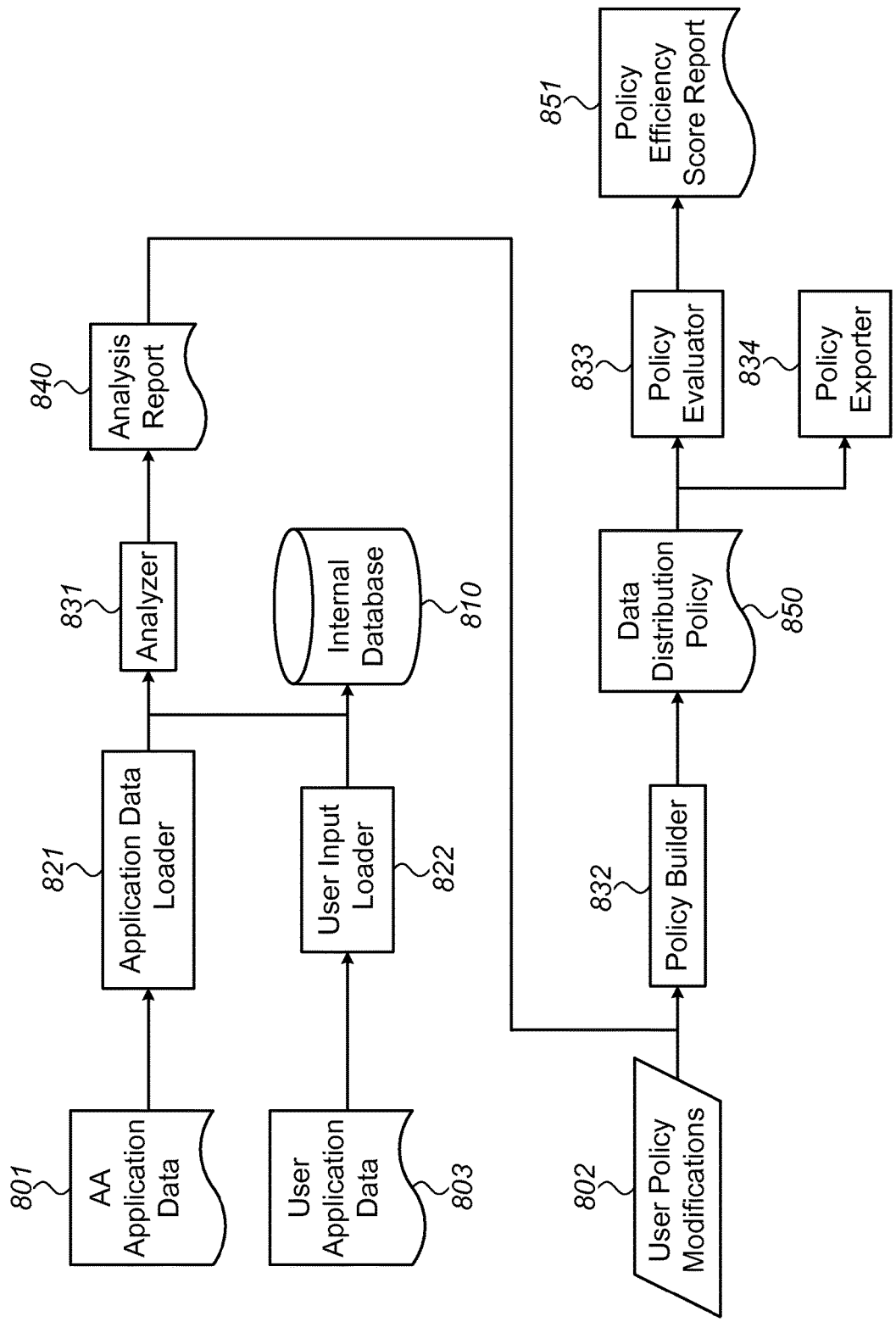
FIG. 8 shows a flowchart and components of a system according to an embodiment of the present invention.

Reference is made to FIG. 8 that shows a flowchart and components of a system according to an embodiment of the present invention. Generally, the components shown in FIG. 8 may be included in AG 225. As shown, application data loader 821 and user input loader 822 may receive application data 801 and user application data 803 and provide the data to analyzer 831 and internal database 810. As shown, analyzer 831 may produce analysis report 840. As shown, analysis report 840 and user policy modifications 802 may be provided to policy builder 832 that may produce data distribution policy 850. As shown, data distribution policy 850 may be provided to policy evaluator 833 and to policy exporter 834. As shown, policy evaluator 833 may create and present a policy efficiency score report 851. Policy exporter 834 may export a policy, e.g., provide a policy to an external system.

Figure 9:
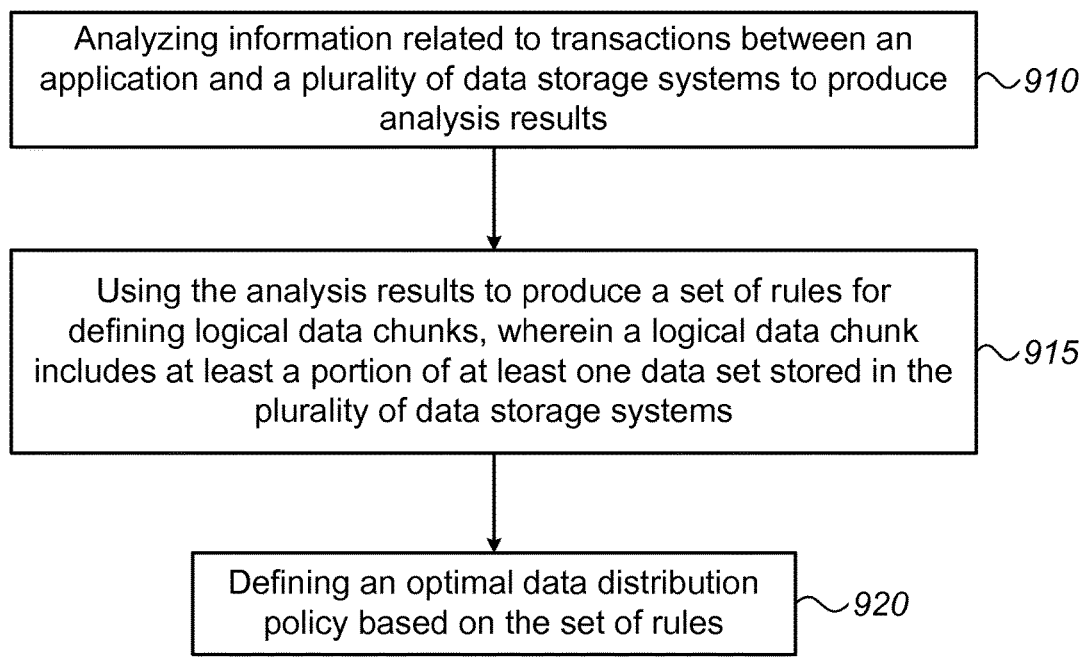
FIG. 9 shows a flowchart according to an embodiment of the present invention.

Reference is made to FIG. 9 that shows a flowchart according to an embodiment of the present invention. As shown by block 910, a method may include analyzing information related to transactions between an application and a plurality of data storage systems to produce analysis results. For example, AA 215 may capture transactions between use computer 210 and database 230. Captured or obtained information related to transactions may include metadata related to tables or data sets stored in the plurality of data storage systems. For example, AG 225 may query database 230 and receive from database 230 metadata related to tables stored in database 230, e.g., sizes, number of accesses made to a table, structure of tables and the like.

Information obtained and processed (e.g., by AG 225 and AA 215) may include transactions (payload and metadata related to transactions), activity per table or data set, join operations per transaction or per table, database schema, structures of tables, size of tables and activity related to tables. For example AA 215 may capture or obtain information related to transactions as described and AG 225 may obtain information from database 230 as described. Any information obtained by AG 225 and AA 215 may be analyzed to produce analysis results that may be used to define a set of rules that may be used to define a data distribution policy. Other systems, methods or sources for obtaining information may include a log file (e.g., in database 230), a network sniffer that monitors data on network 220 and a proxy as known in the art.

Analysis results may include identifying access patterns and may further include analyzing information related to access patterns. For example, sequences of reads or writes to database 230 may be identified or a recognizable flow of webpages to/from database 230 may be identified. For example, in an exemplary online banking flow, procedure or operation, a set or sequence of requests may repeat itself when users deposit money, the set or sequence of requests may be identified as a flow. As described, a distribution policy based on the above exemplary online banking flow may cause all tables accessed in the set or sequence of requests to be stored in the same shard such that the flow is optimized with respect to efficiency, performance or cost.

As shown by block 915, a method may include using the analysis results to produce a set of rules for defining logical data chunks, wherein a logical data chunk includes at least a portion of at least one data set stored in the plurality of data storage systems. Producing a set of rules as described may include recording a number of application transactions, e.g., storing payload and metadata of transactions in a memory, selectively replacing entries, fields or portions in the recorded transactions to produce normalized transactions, and producing the set of rules based on analyzing the normalized transactions. For example, generating a normalized version of a transaction may include replacing a value or term (e.g., a "where" clause) by a predefined string or value (e.g., 'str1').

As described, based on analyzing information as described, AG 225 or AA 215 may identify a plurality of portions of data sets accessed with relation to a specific transaction. For example, a number rows or columns in a respective number of tables in database 230 may all be accessed in the above exemplary online banking flow and therefore, AG 225 may include the rows or columns in a logical data chunk. Accordingly, a data chunk may include portions of two or more tables or data sets.

AG 225 may include a portion of a data set (e.g., a row or column of a table) in a logical data chunk based on any information, collected or generated, e.g., based on an analysis result. For example, inclusion of a portion of a data set in a logical data chunk may be based on a foreign key in a table, a sequence of transactions related to a table, a loosely coupled relation between tables, table properties and a reference to a data set in two or more requests.

As shown by block 920, a method may include defining an optimal data distribution policy based on the set of rules. For example, an optimal data distribution policy may include, or may define, distribution rules for distribution of portions of data in data sets across a plurality of data storage systems in database 230. For example, a rule may dictate that a set of columns of a respective set of tables are to be stored in a specific shard or a selected server. For example, based on a rule or a data distribution policy, a logical data chunk is stored in a single data shard such that transaction that access data included in the logical data chunk are optimized. For example, based on an optimal data distribution policy a first portion of a table may be stored in a first shard and a second portion of the table may be stored in a second shard. For example, if it is determined that users in first part of the world typically access a first set of columns in a table and users in a second part of the world typically access a second set of columns in the same table then a policy may define that the table is to distributed and further that the first set of columns will be stored in a first shard or server (e.g., one geographically close to the first part of the world) and the second set of columns is to be stored in a second shard or server.

A set of efficiency scores for a set of data distribution policies may be calculated. For example, for each of a set of distribution policies, AG 225 may calculate efficiency scores or metrics such as, for example, time to generate a response, number of operations required to generate a response or access a table and the like. Scores and metrics may be presented to a user who may select a distribution policy based on presented policies and scores.

A distribution policy or rule may be defined based on any one of: a sharding root a data set, user selection, input or selection as described. A distribution policy or rule may be defined based on a size of a data set, a set of data sets related to a specific data set. A distribution policy or rule may be defined based on data access pattern to the data set as described.

As described, a distribution and usage of data sets may be presented to a user, user input may be then received and a system or method may define a logical data chunk based on input from the user. For example, provided with a graphical presentation of distribution and usage of data in a database, a user may indicate that columns or rows in one or more tables are to be include in a logical data chunk. As described, a logical data chunk may be treated as an entity that may, for example, be stored in a single shard or may be distributed based on a policy for distributing logical data chunks.

For example, a system and method may provide and present (e.g., graphically), for a selected or specific table or data set, data access patterns related to the data set, join operations related to the data set, transactions referencing the data set, the size of the data set and data growth pattern of the data set. For example, the rate with which a table is growing in size over time may be presented to help a user select a policy or distribution. Other aspects graphically presented may be, the number of writes to a table, the number of reads from a table, the number of references to a table in join operations and the number of references from a table in join operations.

Various efficiency metrics or scores may be generated, provided and presented. For example, efficiency metrics or scores generated and presented may be presented for a data distribution or for access to a specific, single or selected shard or server. Efficiency metrics or scores generated and presented may be related, or for, cross shard data access, global tables reads, of global table writes, unique or specific statements or transactions, total statements or transactions and/or blocked statements or transactions.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method comprising:
   collecting statements from an application directed to a database located in at least one data server in a plurality of data servers, wherein the statements collected include a command stream;
   producing analysis results by analyzing information including the collected statements, wherein producing the analysis results includes:
      identifying in the command stream of the collected statements patterns of command that appear together; and
      identifying related tables in the database from the identified patterns of command; and
   using the analysis results to produce a data distribution policy having one or more rules for defining logical data chunks of the database that include at least the related tables and for distributing and managing the logical data chunks for storage among the plurality of data servers in a horizontally partitioned database.

2. The method of claim 1 wherein producing analysis results further comprises analyzing metadata related to data sets stored in the plurality of data servers and accessed by the application.

3. The method of claim 1, further comprising defining and storing a plurality of logical data chunks according to the data distribution policy, wherein no logical data chunk of the plurality of logical data chunks is distributed between more than one data server in the plurality of data servers.

4. The method of claim 1 further comprising defining and storing a plurality of logical data chunks according to the data distribution policy, wherein the data of one of the logical data chunks of the plurality of logical data chunks are stored entirely on a single one of the data servers of the plurality of data servers.

5. The method of claim 1, further comprising defining and storing a plurality of logical data chunks according to the data distribution policy, wherein the data of a first one of the logical data chunks of the plurality of logical data chunks are stored entirely on a first one of the data servers of the plurality of data servers, and the data of a second one of the logical data chunks of the plurality of logical data chunks are stored entirely on a second one of the data servers of the plurality of data servers.

6. The method of claim 1 further comprising defining a particular logical data chunk according to the data distribution policy, wherein the particular logical data chunk includes portions of related data in a plurality of data sets.

7. The method of claim 1 further comprising defining a particular logical data chunk according to the data distribution policy, wherein the data of the particular logical data chunk are stored in a single shard.

8. The method of claim 1, further comprising calculating a first efficiency score for the data distribution policy and presenting the first efficiency score and policy to a user.

9. The method of claim 1 wherein the information analyzed to produce analysis results further comprises at least one of: activity per data set, join operations, database schema, structures of data sets, and size of data sets.

10. The method of claim 1 wherein the step of collecting statements is performed by one or more of: a collection unit, a network sniffer, a log file, and a database proxy.

11. The method of claim 1 further comprising selectively replacing and obfuscating entries in the collected statements to produce normalized aggregated statements, wherein the information analyzed to produce analysis results includes the normalized aggregated statements.

12. The method of claim 1 further comprising defining a particular logical data chunk according to the data distribution policy, wherein the particular logical data chunk includes all portions of data sets accessed in a set or sequence of statements.

13. The method of claim 1, further comprising graphically presenting a distribution and usage of data sets to a user and defining a logical data chunk based on input from the user.

14. The method of claim 1, further comprising defining a particular logical data chunk according to the data distribution policy, and including at least portions of a first data set and at least portions of a second data set in the particular logical data chunk upon determining the first data set is linked to the second data set based on at least one of: a foreign key in the first data set, name matching between the first and second data sets, both the first and second data set being referred to in a request, both the first and second data set being referred to in a flow of statements, and data from the first and second data sets being joined in a join operation.

15. The method of claim 1, further comprising graphically presenting to a user, for a data set, at least one of: data access patterns related to the data set, join operations related to the data set, transactions referencing the data set, and size of the data set and data growth pattern of the data set.

16. The method of claim 1, further comprising graphically presenting to a user, for the data distribution policy, efficiency metrics related to at least one of: data access to a selected shard, cross-shard data access, global table reads, global table writes, a specific statement, total statements and blocked statements.

17. The method of claim 8 further comprising calculating a second efficiency score for a second data distribution policy and presenting the second efficiency score to the user.

18. An article comprising a computer-readable storage medium, having stored in a non-transitory manner thereon instructions that, when executed by a controller, cause the controller to:
  collect statements from an application directed to a database located in at least one data server in a plurality of data servers, wherein the statements collected include a command stream;
  produce analysis results by analyzing information including the collected statements, wherein to produce the analysis results includes:
    to identify in the command stream of the collected statements patterns of command that appear together; and
    to identify related tables in the database from the identified patterns of command; and
  use the analysis results to produce a data distribution policy having one or more rules for defining logical data chunks of the database that include at least the related tables and for distributing and managing the logical data chunks for storage among the plurality of data servers in a horizontally partitioned database.

19. The article of claim 18 wherein producing analysis results further comprises analyzing metadata related to data sets stored in the plurality of data servers and accessed by the application.

20. The article of claim 18, wherein the instructions further cause the controller to define and store a plurality of logical data chunks according to the data distribution policy, wherein no logical data chunk of the plurality of logical data chunks is distributed between more than one data server in the plurality of data servers.

21. The article of claim 18 wherein the instructions further cause the controller to define and store a plurality of logical data chunks according to the data distribution policy, wherein the data of one of the logical data chunks of the plurality of logical data chunks are stored entirely on a single one of the data servers of the plurality of data servers.

22. The article of claim 18, wherein the instructions further cause the controller to define and store a plurality of logical data chunks according to the data distribution policy, wherein the data of a first one of the logical data chunks of the plurality of logical data chunks are stored entirely on a first one of the data servers of the plurality of data servers, and the data of a second one of the logical data chunks of the plurality of logical data chunks are stored entirely on a second one of the data servers of the plurality of data servers.

23. The article of claim 18 wherein the instructions further cause the controller to define a particular logical data chunk according to the data distribution policy, wherein the particular logical data chunk includes portions of related data in a plurality of data sets.

24. The article of claim 18 wherein the instructions further cause the controller to define a particular logical data chunk according to the data distribution policy, wherein the data of the particular logical data chunk are stored in a single shard.

25. The article of claim 18, wherein the instructions further cause the controller to calculate a first efficiency score for the data distribution policy and present the first efficiency score and policy to a user.

26. The article of claim 18 wherein the information analyzed to produce analysis results further comprises at least one of: activity per data set, join operations, database schema, structures of data sets, and size of data sets.

27. The article of claim 18 wherein the step of collecting statements is performed by one or more of: a collection unit, a network sniffer, a log file, and a database proxy.

28. The article of claim 18 wherein the instructions further cause the controller to selectively replace and obfuscate entries in the collected statements to produce normalized aggregated statements, wherein the information analyzed to produce analysis results includes the normalized aggregated statements.

29. The article of claim 18 wherein the instructions further cause the controller to define a particular logical data chunk according to the data distribution policy, wherein the particular logical data chunk includes all portions of data sets accessed in a set or sequence of statements.

30. The article of claim 18, wherein the instructions further cause the controller to graphically present a distribution and usage of data sets to a user and define a logical data chunk based on input from the user.

31. The article of claim 18, wherein the instructions further cause the controller to define a particular logical data chunk according to the data distribution policy, and include at least portions of a first data set and at least portions of a second data set in the particular logical data chunk upon determining the first data set is linked to the second data set based on at least one of: a foreign key in the first data set, name matching between the first and second data sets, both the first and second data set being referred to in a request, both the first and second data set being referred to in a flow of statements, and data from the first and second data sets being joined in a join operation.

32. The article of claim 18, wherein the instructions further cause the controller to graphically present to a user, for a data set, at least one of: data access patterns related to the data set, join operations related to the data set, transactions referencing the data set, and size of the data set and data growth pattern of the data set.

33. The article of claim 18, wherein the instructions further cause the controller to graphically present to a user, for the data distribution policy, efficiency metrics related to at least one of: data access to a selected shard, cross-shard data access, global table reads, global table writes, a specific statement, total statements and blocked statements.

34. The article of claim 25 wherein the instructions further cause the controller to calculate a second efficiency score for a second data distribution policy and present the second efficiency score to the user.

35. A system for analysis and management of data distribution in a distributed database environment, comprising:
  a processor; a first agent running on the processor for collecting statements between an application and a database located in at least one data server in a plurality of data servers, wherein the statements collected include a command stream; and
  a second agent running on the processor for:
  analysis results by analyzing information including the collected statements, wherein
    producing the analysis results includes:
      identifying in the command stream of the collected statements patterns of command that appear together; and
      identifying related tables in the database from the identified patterns of command; and
    using the analysis results to produce a data distribution policy having one or more rules for defining logical data chunks of the database that include at least the related tables and for distributing and managing the logical data chunks for storage among the plurality of data servers in a horizontally partitioned database.

* * * * *